United States Patent
Zhang et al.

(10) Patent No.: US 11,275,262 B2
(45) Date of Patent: Mar. 15, 2022

(54) GLASS PANEL FOR DISPLAY SCREEN, METHOD OF PREPARING THE SAME, DISPLAY SCREEN AND THE METHOD OF PREPARING THE SAME

(71) Applicants: BOE TECHNOLOGY GROUP CO., LTD., Beijing (CN); Hefei Xinsheng Optoelectronics Technology Co., Ltd., Anhui (CN)

(72) Inventors: Wei Zhang, Beijing (CN); Peng Li, Beijing (CN); Yi Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 932 days.

(21) Appl. No.: 15/779,989

(22) PCT Filed: Sep. 27, 2017

(86) PCT No.: PCT/CN2017/103628
§ 371 (c)(1),
(2) Date: May 30, 2018

(87) PCT Pub. No.: WO2018/149140
PCT Pub. Date: Aug. 23, 2018

(65) Prior Publication Data
US 2021/0173251 A1 Jun. 10, 2021

(30) Foreign Application Priority Data
Feb. 15, 2017 (CN) .......................... 201720136398.0

(51) Int. Cl.
*G02F 1/1333* (2006.01)

(52) U.S. Cl.
CPC .... *G02F 1/133331* (2021.01); *G02F 2201/56* (2013.01)

(58) Field of Classification Search
CPC ......... G02F 1/133331; G02F 1/133302; G02F 2201/56; G02F 1/133351
See application file for complete search history.

(56) References Cited

U.S. PATENT DOCUMENTS 9,339,993 B2    5/2016  Cites et al.
10,162,234 B2*  12/2018  Li ....................... G02F 1/13452
(Continued)

FOREIGN PATENT DOCUMENTS

CN    102740623 A    10/2012
CN    103123070 A    5/2013
(Continued)

OTHER PUBLICATIONS

Search Report and Written Opinion for International Application No. PCT/CN2017/103628 dated Jan. 4, 2018.

*Primary Examiner* — Jia X Pan
(74) *Attorney, Agent, or Firm* — Calfee, Halter & Griswold LLP

(57) ABSTRACT

The present disclosure provides a glass panel of a display screen, of which each side bulges outwards gradually with respect to a connection line of opposing ends of the side, with a vertical distance from a point on the side between an end and a midpoint of the side to the connection line of the opposing ends of the side increasing gradually in a direction from the end to the midpoint.

18 Claims, 2 Drawing Sheets

(56) References Cited

U.S. PATENT DOCUMENTS

| | | | |
|---|---|---|---|
| 10,204,535 B2* | 2/2019 | Yamazaki | G09G 3/035 |
| 10,403,703 B2* | 9/2019 | Yamazaki | H01L 27/3276 |
| 2009/0002575 A1* | 1/2009 | Yamada | B60R 1/04 |
| | | | 349/1 |
| 2009/0102758 A1* | 4/2009 | Anzai | G09G 3/2096 |
| | | | 345/76 |
| 2013/0164483 A1 | 6/2013 | Cites et al. | |
| 2015/0110991 A1* | 4/2015 | Miwa | B23K 26/40 |
| | | | 428/77 |
| 2015/0323830 A1* | 11/2015 | Peng | H01L 21/78 |
| | | | 428/189 |
| 2015/0355768 A1* | 12/2015 | Kuwahara | G06F 3/03549 |
| | | | 345/157 |
| 2016/0150062 A1 | 5/2016 | Rhee | |
| 2016/0240141 A1* | 8/2016 | Lee | G09G 3/3258 |
| 2017/0322446 A1* | 11/2017 | Tae | G02F 1/133345 |
| 2018/0122303 A1* | 5/2018 | Tsai | G02F 1/13452 |
| 2019/0263322 A1* | 8/2019 | Hayashi | B60R 1/08 |

FOREIGN PATENT DOCUMENTS

| | | | |
|---|---|---|---|
| CN | 103201230 A | 7/2013 | |
| CN | 206472221 U | 9/2017 | |
| EP | 2616404 A2 | 7/2013 | |
| KR | 101519987 B1 | 5/2015 | |
| WO | 2012037094 A2 | 3/2012 | |

* cited by examiner

GLASS PANEL FOR DISPLAY SCREEN, METHOD OF PREPARING THE SAME, DISPLAY SCREEN AND THE METHOD OF PREPARING THE SAME

CROSS-REFERENCE TO RELATED APPLICATIONS

This application is based upon International Application No. PCT/CN2017/103628, filed on Sep. 27, 2017, which is based upon and claims priority to Chinese patent application No. 201720136398.0 filed on Feb. 15, 2017, the entire contents of which are hereby incorporated by reference.

TECHNICAL FIELD

The disclosure relates to the technical field of display screens, in particular to a glass panel for display screen and a display screen.

BACKGROUND

With the development of large-size display screen technology and the increasing improvement of people's consumption level, the products of large-size, such as televisions (TVs), are becoming more and more popular with consumers.

One of the common disadvantages of TV products having large-size display screens is light leakage at the corners of the display screen. In particular, lighting with low-gray at the lower two corners of the display screen shows diffused light leakage, which seriously affects the quality of ADS (Advanced Super Dimension Switch) TV products.

The reason for the above problem is as follows. The glass panel of the display screen will be subject to a certain amount of contraction by influence of the stress within the glass after having been cut. FIG. 1 shows a glass panel having contracted due to inner stress in a fine line, and a bezel of the display screen in a heavy line. The larger the size of the glass panel is, the greater the amount of contraction is. After being assembled, the display screen is subject to gravity when placed vertically, and the glass panel of the display screen has only the left and right corners resting on the bezel (as shown in FIG. 1 in a dotted line), and is pressed and deformed at the corners, which may change the normal polarization propagating mode of polarized light and cause light leakage.

The conventional improvement method is to increase the amount of liquid crystal within the display screen to reduce the influence of stress on the liquid crystal. However, such a method severely restricts the range of amount of liquid crystal, meanwhile bringing about a problem of gravitational display nonuniformity. Accordingly, the method has a serious drawback and cannot effectively relieve the corner light leakage.

SUMMARY

The embodiments of the present disclosure disclose a glass panel of a display screen, of which each side bulges outwards gradually with respect to a connection line of 2 opposing ends of the side, with a vertical distance from a point on the side between an end of the side and a midpoint of the side to the connection line of the opposing ends of the side increasing gradually in a direction from the end to the midpoint.

In an exemplary embodiment of the present disclosure, each side of the glass panel has at least three cutting marks for segmental marking when the glass panel is cut.

In an exemplary embodiment of the present disclosure, the outer shape of the glass panel has a bulging amount which is the same as a contraction amount. Here, the bulging amount refers to a vertical distance from a point on the side to the connection line of the ends of the side of the glass panel when the side of the glass panel protrudes beyond the connection line of the ends of the side of the glass panel for cut. The contraction amount refers to the deformation amount of the side of the glass panel in a direction perpendicular to the connection line of the ends of the side after the glass panel has been cut.

In an exemplary embodiment of the present disclosure, the cutting marks comprise the two ends of each side of the glass panel.

In an exemplary embodiment of the present disclosure, the bulging amount of the longer sides of the glass panel is greater than that of the shorter sides of the glass panel.

In an exemplary embodiment of the present disclosure, each side is of a shape symmetric about the midpoint of the side.

In an exemplary embodiment of the present disclosure, the outer shape of the glass panel is axisymmetric and/or centrosymmetric.

In an exemplary embodiment of the present disclosure, each side of the glass panel is of a shape of an arc of a circle which corresponds to a central angle of less than 0.04 degrees.

In an exemplary embodiment of the present disclosure, the sides of the glass panel of the shape of an arc of a circle correspond to a same central angle of the circle and/or to circles having a same diameter.

Embodiments of the present disclosure also disclose a display screen, which includes the above-mentioned glass panel.

Embodiments of the present disclosure also disclose a method of preparing a glass panel and a method of preparing a display screen.

BRIEF DESCRIPTION OF THE DRAWINGS

In order to more clearly describe the technical solutions of the embodiments of the present disclosure, the drawings used for the description of the embodiments of the present disclosure will be briefly described below. It is obvious that the drawings in the following description involve only some of the embodiments of the present disclosure. From the drawings, those skilled in the art will obtain other drawings without any creative effort.

DETAILED DESCRIPTION

Now the technical solutions in the embodiments of the present disclosure will be clearly and completely described with reference to the accompanying drawings in the embodiments of the present disclosure. Obviously, the described embodiments are part, rather than all, of the embodiments of the present disclosure. All other embodiments obtained by those skilled in the art from the embodiments of the present disclosure without creative efforts shall fall within the protection scope of the present disclosure.

Figure 1:
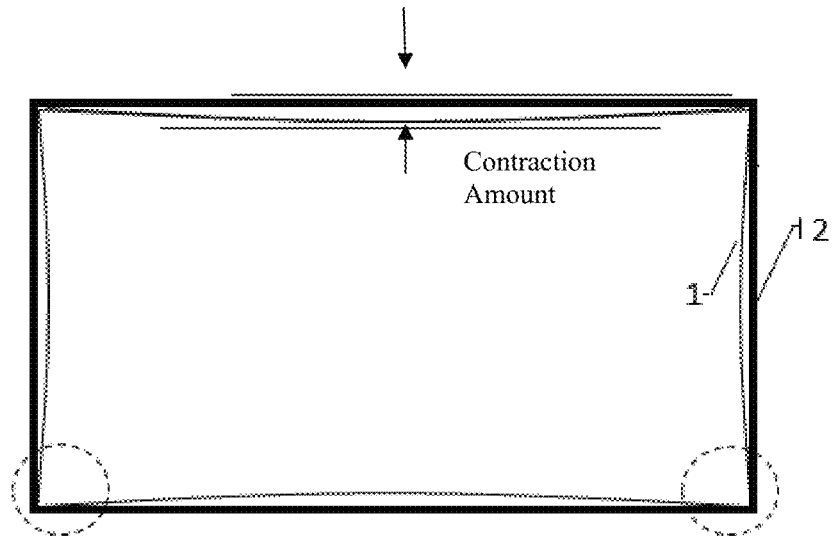
FIG. 1 is a schematic view of deformation after contraction due to stress after a glass panel has been cut according to prior art.
Figure 2:
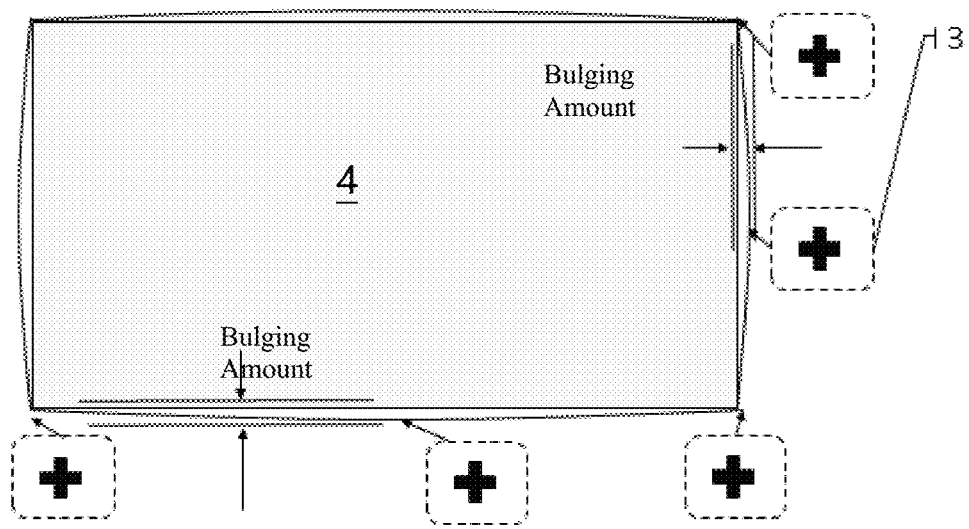
FIG. 2 is a schematic view of an outer shape of a glass panel of a display screen according to an embodiment of the present disclosure.

Referring to FIG. 2 which is a schematic view of an outer shape of a glass panel of a display screen according to an embodiment of the present disclosure. The glass panel can be applied to a large-size display screen to overcome the problem of the large-size display screen having lighting with low-gray at the lower two corners of the display screen in form of diffused light leakage.

In the embodiment of the present disclosure, the outer shape of the glass panel of the display screen is shaped such that each side bulges outwards gradually with respect to a connection line of 2 opposing ends of the side, and a vertical distance from a point on the side between one end of the side and a midpoint of the side to the connection line of the opposing ends of the side increases gradually in a direction from the end to the midpoint. As shown in FIG. 2, each side of the glass panel has at least three cutting marks for segmental marking when the glass panel is cut.

Figure 3:
FIG. 3 is a schematic structural view of a display screen.

Specifically, as shown in FIG. 3, the display screen may typically include a glass panel 4, a bezel 5, an optical film 6, a backplane 7, an LED (Lighting Emitting Diode) source 8, and a circuit drive system. Here, the glass panel 4 may be filled therein with liquid crystal material such that the arrangement of molecules inside the liquid crystal material may be changed by a voltage in order to block and transmit light to display well-arranged images with corresponding darker and/or lighter gray levels.

In a specific embodiment, before assembling the display screen, the glass panel of the display screen may be prepared for use in assembly by cutting a small piece of glass of predetermined size from a whole piece of large glass along cutting marks provided at predetermined positions on the glass surface. Here, the cutting marks are used to provide marks for cutting the glass panel.

In the embodiment of the present disclosure, in order to cancel out the influence of the inward contraction caused by the internal stress of the glass panel after the glass panel has been cut, the outer shape of the glass panel at the time of being cut may be designed such that each side bulges outwards gradually with respect to a connection line of 2 opposing ends of the side, and a vertical distance of a point on the side between one end and a midpoint thereof from the connection line of the opposing ends of the side increases gradually in a direction from the end to the midpoint. Such a shape is referred to as "gradually bulging shape from midpoint to ends".

In order to facilitate the design of the shape of the glass panel at the time of being cut to be the gradually bulging shape from midpoint to ends, each side of the glass panel may be provided thereon with at least three cutting marks which divide the side into a plurality of small segments such that, when a marking is performed, a segmental marking may be made so as to facilitate cutting the respective sides of the glass panel into the gradually bulging shape from midpoint to ends.

To facilitate provision of positions of the cutting marks, the cutting marks include the two ends of the respective sides of the glass panel.

In order to better cancel out the influence of the inward contraction caused by the internal stress of the glass panel after the glass panel has been cut, the bulging amount of the outer shape of the glass panel may be defined to be the same as the contraction amount. Here, the bulging amount refers to a vertical distance of a point on a side from a connection line of the ends of the side of the glass panel if the side of the glass panel protrudes beyond the connection line of the ends of the side of the glass panel at the time of being cut, for example, a maximum distance. The contraction amount refers to the deformation amount of a side of the glass panel in a direction perpendicular to the connection line of the ends of the side after the glass panel has been cut, for example, a maximum distance between points on a side and the connection line of the ends of the side.

In the embodiment of the present disclosure, in order to obtain the contraction amount of each side of the glass panel of the display screen with a predetermined size, a predetermined number of panels of display screen may be collected, the contraction amount of the perspective sides may be measured, respectively, and the contraction amount of each side may then be worked out by way of obtaining average value or weighted average value, which then is taken as a reference for the bulging amount of the outer shape of the glass panel.

For example, with the above method, the contraction amount of the midpoint of the longer side of the glass panel with 65 inches may be obtained, which is in the range of 0.8 mm to 1.0 mm, and the contraction amount of the midpoint of the shorter side may be in the range of 0.06 to 0.09 mm.

Of course, those skilled in the art may also calculate the contraction amount of each side of the glass panel of the display screen with a predetermined size with other methods. Embodiments of the present disclosure do not have any limitations thereto.

In the embodiment of the present disclosure, if the contraction amount of each side of the glass panel is not easy to obtain in practice, only the contraction amount of the midpoint on a widthwise side may be obtained. Because one end on the side has a contraction amount of zero, and the midpoint has a maximum contraction amount, accordingly, the bulging amount of the midpoint on the widthwise side is set to be the maximum, and that of the end is set to zero. Since it is not convenient to obtain the bulging amount of other points, a mathematical curve method may be used to simulate a section of smooth and gradually changing bulging shape from one end to the midpoint, then an axisymmetric method may be used to supplement a gradually changing bulging shape from the other end to the midpoint, and finally an axisymmetric and/or centrosymmetric method may be used to supplement a gradually changing bulging shape for the opposite side.

Similarly, for the method of designing the gradually changing bulging shape for the lengthwise side, reference can be made to the above-mentioned method for the widthwise side. Repeated descriptions will not be made in detail in this embodiment of the present disclosure.

It should be noted that the contraction amount of the lengthwise side is usually larger than that of the widthwise side. Accordingly, the bulging amount of the lengthwise side is larger than that of the widthwise side.

In a preferred embodiment of the present disclosure, the above mathematical curve may include circular arcs, elliptic arcs, or hyperbolic arcs.

In another preferred embodiment of the present disclosure, in order to better simulate the actual situation with a circular arc, the central angle of the arc corresponding to each side is less than 0.04 degrees, and the corresponding central angle of the arc corresponding to each opposite side is the same, and/or the corresponding arcs corresponding to the opposite sides of the glass panel have the same diameter.

Figure 4:
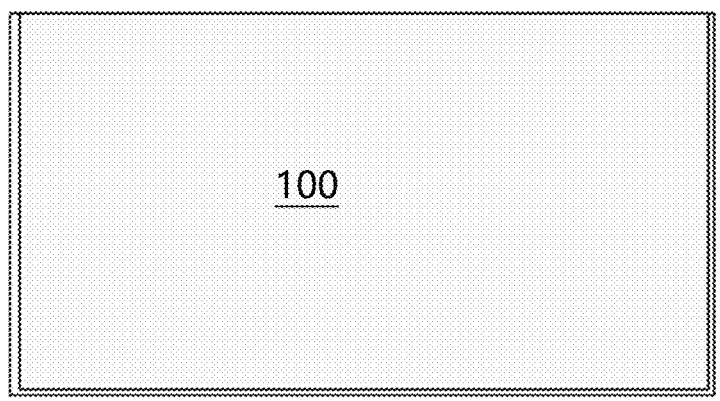
FIG. 4 is a schematic view of the outer shape of a finished product of display screen assembled with a glass panel according to an embodiment of the present disclosure.

With each side being designed to be the gradually bulging shape from midpoint to ends when the glass panel is cut, since the glass panel will contract inwardly due to the inner stress in the glass panel glass, and the bulging amount and the contraction amount will cancel out each other, therefore, as shown in FIG. 4 which is a schematic view of the outer shape of a finished product of display screen 100 assembled with a panel according to an embodiment of the present disclosure, the outer shape of the finished product of display screen assembled with the glass panel according to the embodiment of the present disclosure is still a normal rectangle.

In the embodiment of the present disclosure, three or more cutting marks on the glass panel of the display screen are provided so as to facilitate cutting the glass panel into the gradually bulging shape from midpoint to ends at the time of being cut. After the glass panel is cut and then assembled, because of the contraction caused by its internal stress, the actual outer shape of the glass panel becomes a normal rectangle with four uniform sides, and finally, a multi-point contact or full-side contact with the bezel of the glass panel is realized, relieving the deformation due to the internal stress of the glass panel and the resulting light leakage at the corners of the display screen.

In another embodiment of the present disclosure, it is also possible to firstly cut the glass panel into a normal rectangle with a size slightly larger than the predetermined size according to the contraction amount obtained in advance, and then get the glass panel shape with four bulging sides by adjustment with a process of grinding the sides. That is to say, after the cutting is completed, the speed of grinding sides and the rotation speed are adjusted such that each side resulted from the grinding is gradually increased from the middle to both ends thereof, and the bulging shape with gradual change from the middle point to the corresponding two ends is formed for each side.

In the embodiment of the present disclosure, by obtaining the contraction amount of each side of the glass panel in advance, the glass panel is cut into a normal rectangle with a size slightly larger than the predetermined size having taking into account the contraction amount, and then after cutting, the normal rectangular panel is ground into a panel having a shape with four bulging sides corresponding to the contraction amount of the sides by adjustment with the process of grinding sides. Accordingly, when the glass panel is actually assembled into a display screen, it contracts due to its internal stress such that the actual outer shape thereof is still a normal rectangle with uniform sides. Finally, a multi-point contact or full-side contact with the bezel of the glass panel is realized, relieving the deformation due to the internal stress of the glass panel and the resulting light leakage at the corner of the display screen.

It should be noted that the above embodiments can be combined with each other so as to better address light leakage at the corners of the display screen.

Embodiments of the present disclosure also disclose a display screen which includes a glass panel.

In the embodiment of the present disclosure, please refer to the description of the foregoing embodiments for the description about the glass panel. Repeated description will not be made in this embodiment.

In this embodiment of the present disclosure, when the glass panel for the display screen is assembled into the display screen, multiple points on each side of the glass panel or the entire sides of the glass panel closely contacts the bezel of the display screen when assembling the display screen.

Although the preferred embodiments of the present disclosure have been described, those skilled in the art will make additional changes and modifications to these embodiments once they learn the basic inventive concept. Therefore, the appended claims are intended to be interpreted as including the preferred embodiments and all changes and modifications that fall within the scope of the embodiments of the present disclosure.

Finally, it should also be noted that, in this context, the terms such as "include", "comprise" or any other variations thereof are intended to cover non-exclusive inclusions such that a process, method, article, or terminal device including a series of elements not only includes those elements, but also includes other elements that are not explicitly listed, or includes elements inherent to such a process, a method, an article, or a terminal device. In the case of no more limitation, the element defined by the sentence "including one . . . " does not exclude existence of other same elements in the process, the method, the article, or the terminal device including the element.

The above descriptions are merely related to specific embodiments of the present disclosure. However, the protection scope of the present disclosure is not limited thereto. Those skilled in the art can easily think of changes or substitutions within the technical scope disclosed by the present disclosure, which should all be covered by the protection scope of the disclosure. Therefore, the protection scope of the present disclosure is determined by the appended claims.

What is claimed is:

1. A glass panel of a display screen, wherein each side of glass panel, at the time of being cut, bulges outwards gradually with respect to a connection line of two opposing ends of the side, and a vertical distance from a point on the side between an opposing end of the two opposing ends and a midpoint of the side to the connection line of the two opposing ends of the side increases gradually in a direction from the end to the midpoint, wherein the outer shape of the glass panel comprises a bulging amount which is the same as a preset contraction amount, and wherein the bulging amount is, when respective sides of the glass panel protrude beyond the connection lines of the corresponding opposing ends of the respective sides of the glass panel at the time of being cut, vertical distances of respective points from the respective sides to the connection lines of the corresponding opposing ends of the respective sides of the glass panel, and the preset contraction amount is a deformation amount of the respective sides of the glass panel in directions perpendicular to the connection lines of the corresponding opposing ends of the respective sides after the glass panel has been cut.

2. The glass panel of a display screen according to claim 1, wherein each side of the glass panel comprises at least three cutting marks for segmental marking.

3. The glass panel of a display screen according to claim 2, wherein the cutting marks comprise the two ends of each side of the glass panel.

4. The glass panel of a display screen according to claim 1, wherein the bulging amount of a longer side of the glass panel is greater than that of a shorter side of the glass panel.

5. The glass panel of a display screen according to claim 1, wherein the each side is of a shape symmetric about the midpoint of the side.

6. The glass panel of a display screen according to claim 1, wherein the outer shape of the glass panel meets at least one condition of being axisymmetric and centrosymmetric.

7. The glass panel of a display screen according to claim 1, wherein the each side of the glass panel is of a shape of an arc of a circle, the arc of the circle corresponding to a central angle of less than 0.04 degrees.

8. The glass panel of a display screen according to claim 7, wherein each opposite sides of the glass panel with the shape of the arc of the circle correspond to the same central angle of the circle and/or to circles having the same diameter.

9. A display screen comprising the glass panel according to claim 1.

10. The glass panel of a display screen according to claim 4, wherein the bulging amount of the midpoint of the longer side of the glass panel is in the range of 0.8 mm to 1.0 mm, and the bulging amount of the midpoint of the shorter side is in the range of 0.06 to 0.09 mm.

11. A method of preparing a glass panel, comprising: cutting a first piece of glass from a second piece of glass, the first piece of glass having a first outer shape of each side, at the time of being cut, bulging outwards gradually with respect to a connection line of two opposing ends of the side, and a vertical distance from a point on the side between an opposing end of the two opposing ends and a midpoint of the side to the connection line of the two opposing ends of the side increasing gradually in a direction from the end to the midpoint:
setting a bulging amount of the first outer shape of the first piece of glass to be the same as a preset contraction amount, wherein the bulging amount is, when respective sides of the first piece of glass protrude beyond the connection lines of the corresponding opposing ends of the respective sides of the first piece of glass at the time of being cut, vertical distances of respective points from the respective sides to the connection lines of the corresponding opposing ends of the respective sides of the first piece of glass, and the preset contraction amount is a deformation amount of the respective sides of the first piece of glass in directions perpendicular to the connection lines of the corresponding opposing ends of the respective sides after the first piece of glass has been cut; and
taking the first piece of glass as a glass panel of a display screen.

12. The method of claim 11, further comprising: setting on each side of the first piece of glass at least three cutting marks for segmental marking when the first piece of glass is cut.

13. The method of claim 11, wherein the step of cutting a first piece of glass from a second piece of glass comprises: cutting the first piece of glass having a second outer shape of a rectangle from the second piece of glass, grinding each side of the first piece of glass such that the first piece of glass having the first outer shape.

14. The method of claim 13, further comprising: grinding the each side of the first piece of glass such that a bulging amount of the first outer shape of the first piece of glass to be the same as a preset contraction amount, wherein the bulging amount is a vertical distance of a point from the side to the connection line of the corresponding ends of the side of the first piece of glass.

15. A method of preparing a display screen, comprising: the method of claim 11; and assembling the glass panel into the display screen.

16. A method of preparing a display screen, comprising: the method of claim 12; and assembling the glass panel into the display screen.

17. A method of preparing a display screen, comprising: the method of claim 13; and assembling the glass panel into the display screen.

18. A method of preparing a display screen, comprising: the method of claim 14; and assembling the glass panel into the display screen.

* * * * *